UNITED STATES PATENT OFFICE.

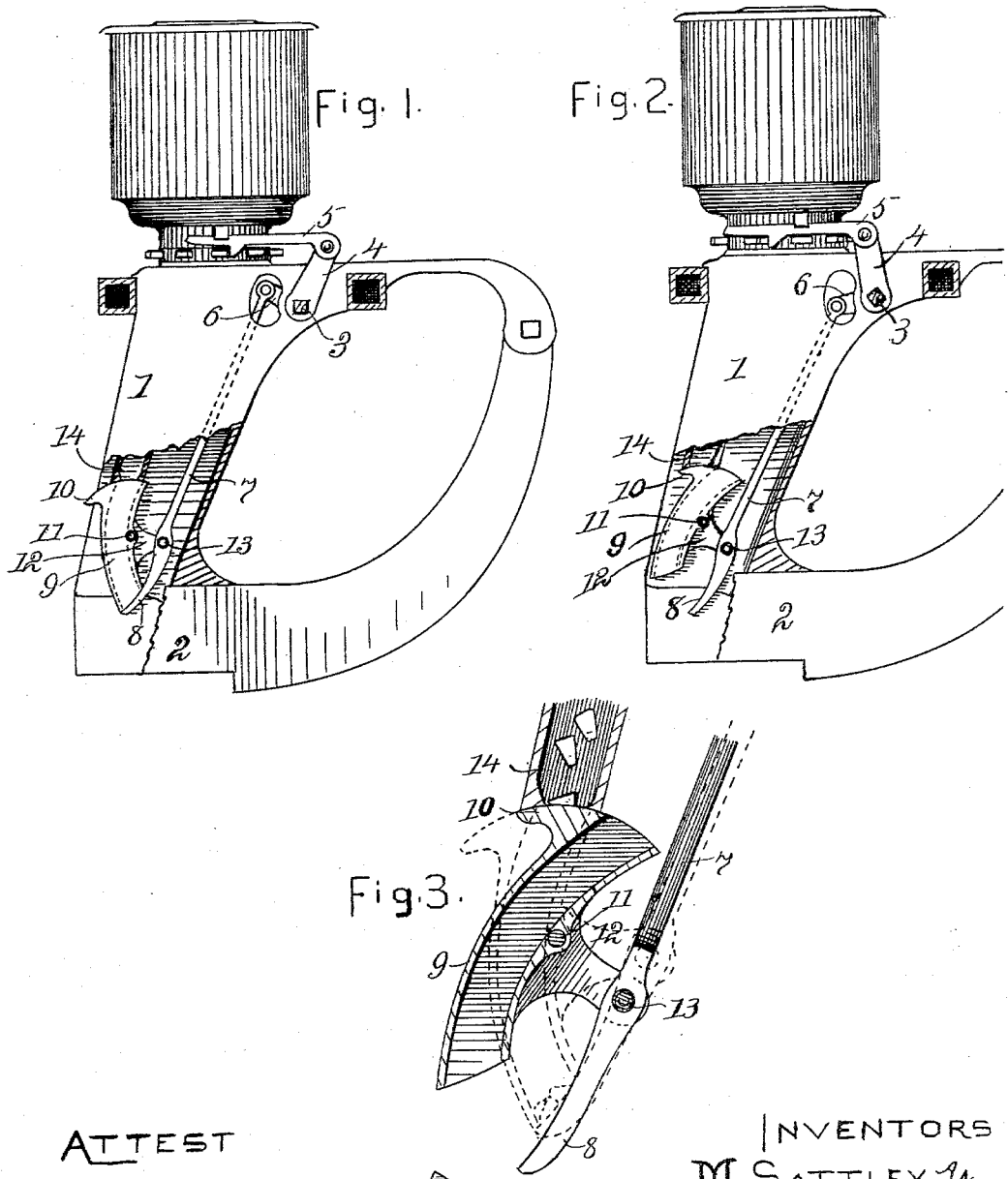

MARSHALL SATTLEY AND MARTIN HEINEKE, OF SPRINGFIELD, ILLINOIS, ASSIGNORS TO THE SATTLEY MANUFACTURING COMPANY, OF SAME PLACE.

CORN-PLANTER.

SPECIFICATION forming part of Letters Patent No. 566,804, dated September 1, 1896.

Application filed June 26, 1896. Serial No. 597,066. (No model.)

*To all whom it may concern:*

Be it known that we, MARSHALL SATTLEY and MARTIN HEINEKE, of Springfield, in the county of Sangamon and State of Illinois, have invented certain new and useful Improvements in Corn-Planters, of which the following is a specification.

This invention relates to the second drop of a check-row planter. It is intended to neutralize the variation in location of deposit of the corn which results from variation in the speed of travel. It is exemplified in the structure hereinafter described, and it is defined in the appended claims.

In the drawings forming part of this specification, Figure 1 is a side elevation of a runner-frame of a planter, with the lower part of the shank and the rear part of one side of the runner broken away to expose the second drop. Fig. 2 is a similar view showing the second drop in a different position. Fig. 3 is a vertical section through the tubular parts of the second drop, illustrating the dropping operation.

A planter-shank is shown at 1, a runner at 2, and a check-row shaft at 3. Arm 4 is fixed on the check-row shaft, and pawl 5, pivoted to the swinging end of the arm, is adapted to impart motion to a first-drop seed-disk. Arm 6 is also fixed on the check-row shaft and a rod 7 is pivoted to its swinging end. The rod extends downward through the shank and terminates at its lower end in a pitch-plate 8. The shank has a seed-chute 14, which terminates some little distance above the pitch-plate of rod 7. Below the seed-chute is a bucket 9, pivoted in the shank at 11 and provided with a rearward-extended lug 12. The upper end of the bucket is adapted to register with the outlet of the chute 14 and receive grains of corn therefrom, and it has a rearward extension 10, that swings under the chute and closes the same while the bucket is discharging its contents. The rod 7 is pivotally connected at 13 with extension 12 and the pitch-plate 8 virtually forms a hinged bottom for the bucket.

The check-row shaft is oscillated at regular intervals by means of a knotted check-row wire, and every time a knot acts the second-drop mechanism is first forced to the position shown in Figs. 2 and 3 and then returned to the position shown in Fig. 1. While the bucket is in the position shown in Fig. 1 seed constituting a "hill" is received from the chute and held in the bottom of the bucket by the pitch-plate or hinged bottom 8.

Second-drop movements of planters are located above the lower edges of the runners and the grain has a few inches to fall in order to reach the bottoms of the furrows. As the planters are moving forward when the seed is dropped the momentum tends to carry the seed forward, and the greater the speed the greater the momentum. In this case when the check-row shaft is rocked backward the bucket swings upward and backward away from the pitch-plate and the corn thereon, and the plate is pitched downward and backward with a velocity dependent on the speed at which the team is driven, thereby pitching the corn backward and also hastening its descent just in proportion to the tendency of its momentum to carry it forward.

What we claim as new, and desire to secure by Letters Patent, is—

1. A second drop for planters comprising a rocking bucket having a hinged bottom that acts as a pitch-plate in discharging the seed.

2. A second drop for planters comprising a rocking bucket, an actuating-rod hinged to the bucket, and a pitch-plate integral with the rod and adapted to close the bottom of the bucket, substantially as set forth.

3. In a planter, the combination of a rock-shaft, an arm thereon, a rocking bucket, and a rod pivotally connected with the arm and with the bucket and having a pitch-plate adapted to close the bottom of the bucket, substantially as set forth.

4. In a planter the combination of a shank, a seed-chute in the shank, a rocking bucket in the shank below the chute, an extension on the bucket adapted to close the chute, and a bucket-actuating rod having a pitch-plate adapted to close the bucket, substantially as set forth.

5. A second drop for planters comprising a downward and backward inclined pitch-plate having a downward and backward discharging motion and means for holding the grain against the plate preparatory to discharge, substantially as set forth.

6. A second drop for planters comprising a downward-extended pitch-plate, a shiftable holder for retaining the grain against the rear surface of the pitch-plate preparatory to discharge action, and a connection between the pitch-plate and the holder whereby the holder will move out of the way as the pitch-plate discharges the grain, substantially as set forth.

In testimony whereof we sign our names in the presence of two subscribing witnesses.

MARSHALL SATTLEY.
MARTIN HEINEKE.

Attest:
J. H. MATHENY,
M. A. CHRISTY.